Sept. 20, 1955 R. W. TAFEL ET AL 2,718,451
OSCILLOGRAPH CAMERA
Filed April 13, 1953 3 Sheets-Sheet 1

INVENTOR.
ROBERT W. TAFEL
RICHARD FRIEDMAN
BY
ATTORNEYS

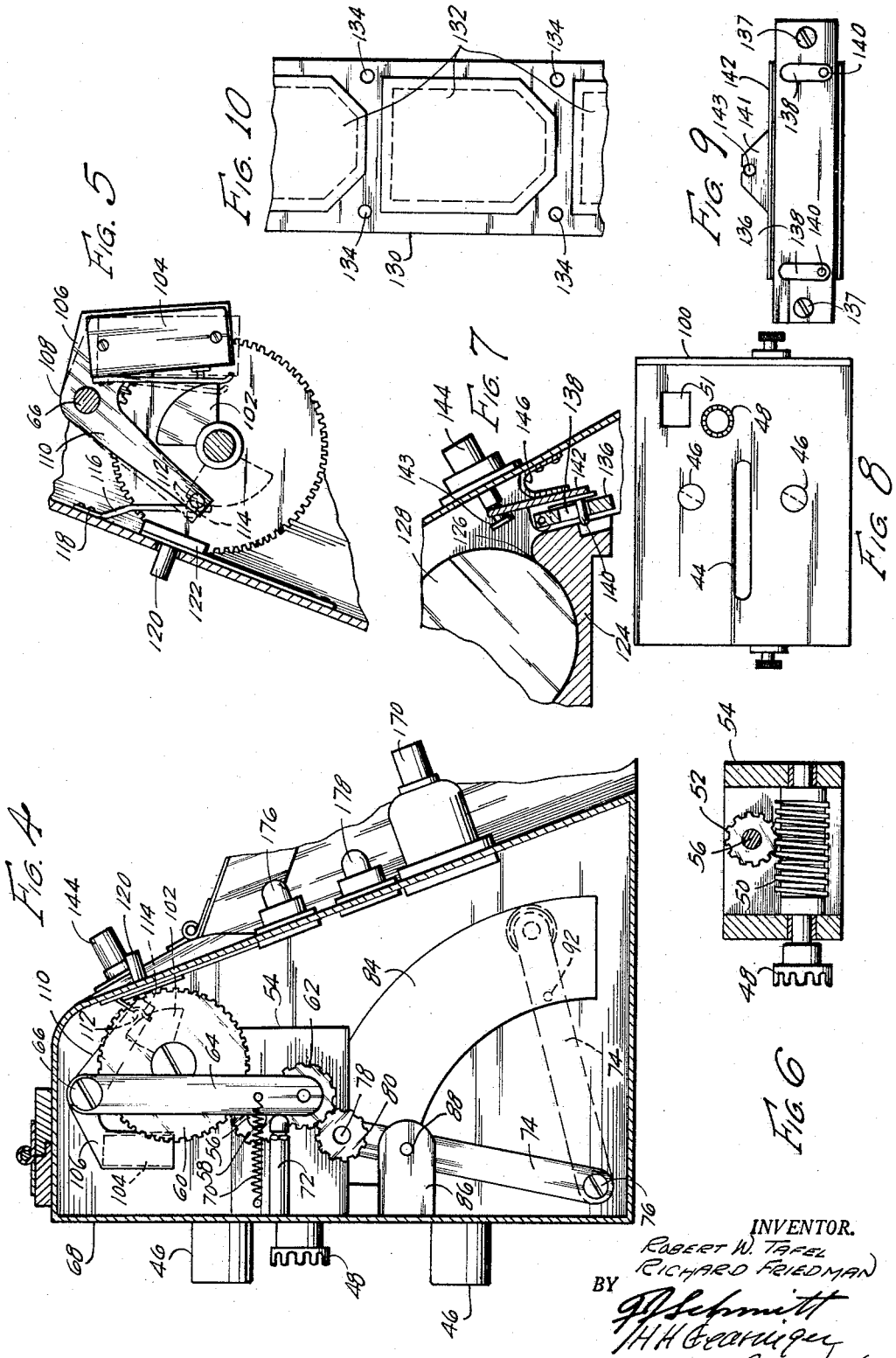

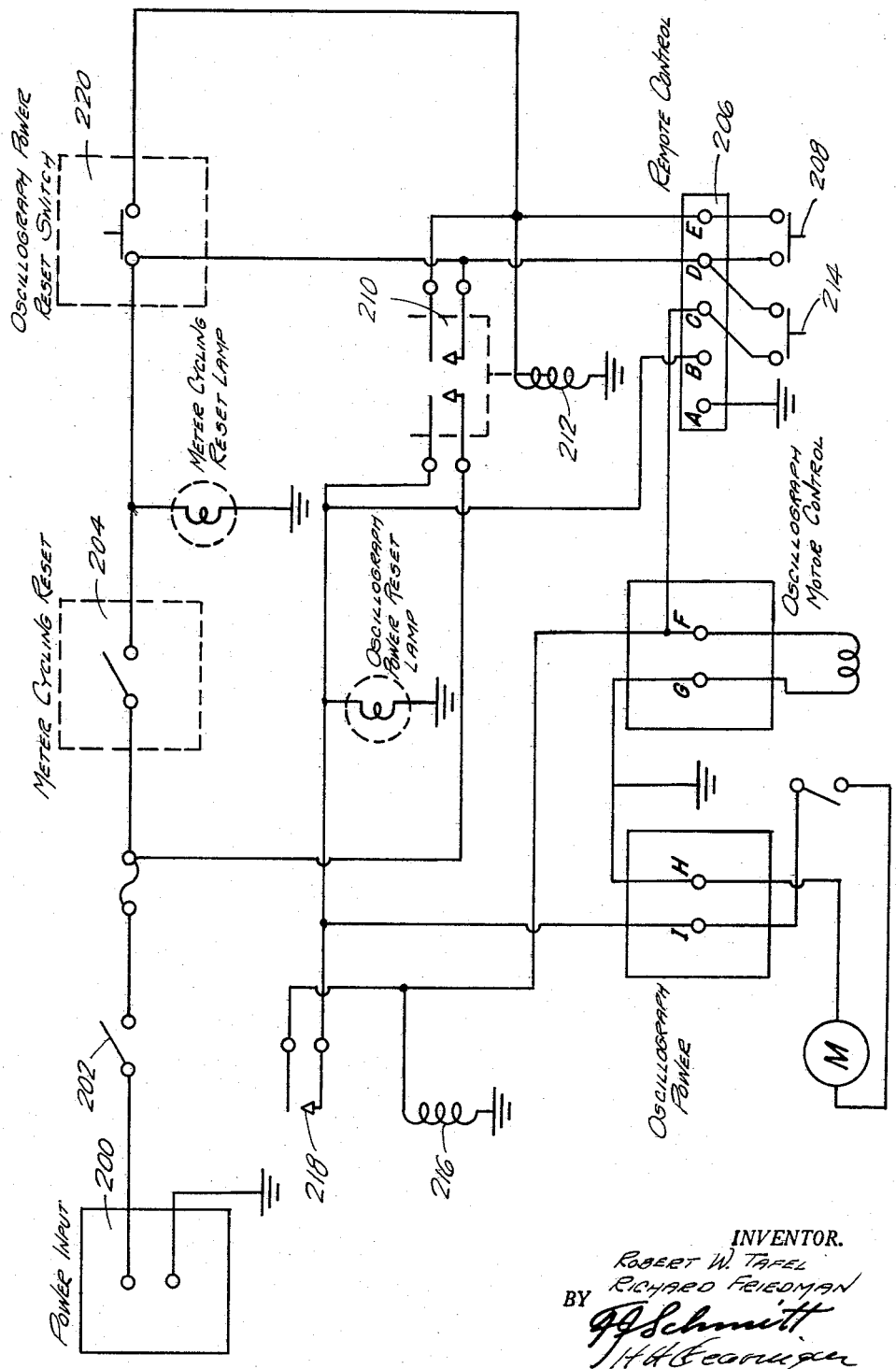

United States Patent Office 2,718,451
Patented Sept. 20, 1955

2,718,451

OSCILLOGRAPH CAMERA

Robert W. Tafel, Drexel Hill, and Richard Friedman, Philadelphia, Pa., assignors to the United States of America as represented by the Secretary of the Navy Application April 13, 1953, Serial No. 348,602

6 Claims. (Cl. 346—107)

(Granted under Title 35, U. S. Code (1952), sec. 266)

The invention described herein may be manufactured by or for the Government of the United States of America for governmental purposes without the payment of any royalties thereon or therefor.

This invention relates to a photographic attachment for an oscillograph and particularly relates to a photographic attachment which not only controls the operation of the oscillograph itself but also produces a rapid photographic record of the oscillograph traces.

Heretofore, the recording of an oscillograph trace was made on standard oscillograph paper which was photographed and the film thereafter processed in the usual manner by developing, fixing, printing and drying. This process required approximately one hour for its completion, and although in many instances the time interval between recording of the tracings and observation thereof was not important, this was not true of many military applications, and particularly where the oscillograph was mounted in an aircraft and rapid observation of certain performance data of the aircraft was necessary.

It is, therefore, one object of this invention to provide a photographic attachment for an oscillograph which is capable of forming a photographic record of oscillograph traces rapidly and efficiently.

Another object of this invention is to provide a photographic attachment for an oscillograph which is capable of automatically controlling the operation of the oscillograph.

Another object of this invention is to provide a photographic attachment for an oscillograph which consists of relatively few parts and which may be rapidly and easily attached to the oscillograph.

Other objects and many of the attendant advantages of this invention will be readily appreciated as the same becomes better understood by reference to the following detailed description when considered in connection with the accompanying drawings wherein:

Fig. 4 is a sectional view taken on line 4—4 of Fig. 1.

Fig. 5 is a view showing the interaction between the cam on the metering gear and the micro-switch.

Fig. 6 is a sectional view of the gear box wherein are positioned the worm and gear drive means.

Fig. 7 is a fragmentary sectional view taken on line 7—7 of Fig. 1.

Fig. 8 is an elevational view of the front end of the attachment taken on line 8—8 of Fig. 1.

Fig. 9 is an elevational view of the bar and spring actuated pins for holding the photosensitive sheet in position.

Fig. 10 is a top plan view of a portion of the photosensitive sheet.

Fig. 11 is a schematic view of the electrical actuating circuit.

Figure 1:
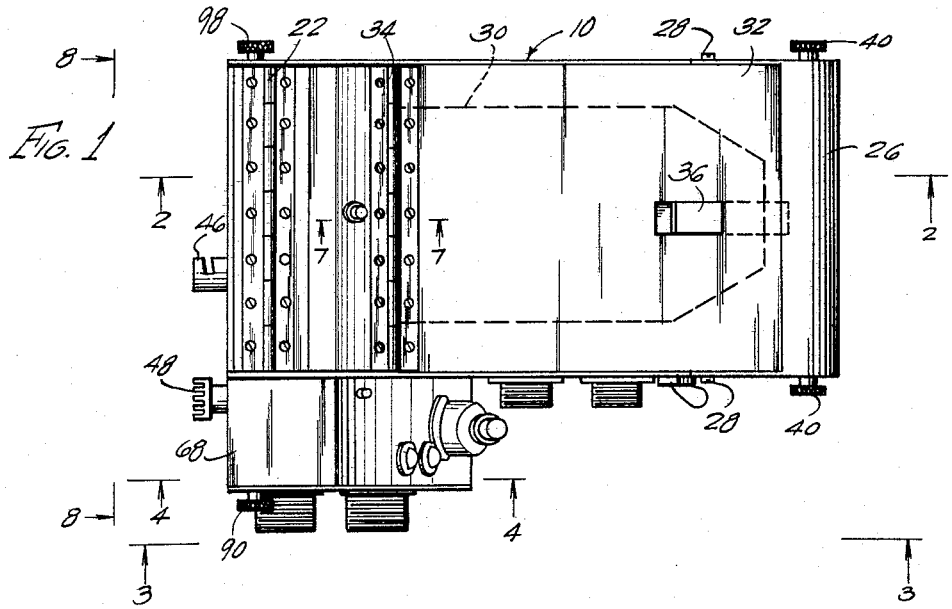
Fig. 1 is a top plan view of an oscillograph attachment embodying the invention.

Referring now in greater detail to the drawings wherein similar reference characters refer to similar parts, there is shown a camera attachment generally designated as 10 which consists of a housing 12 in which is contained the electrical wiring (not shown) for controlling the various components of the camera as well as of the oscillograph, a schematic view of this wiring circuit being illustrated in Fig. 11.

Figure 2:
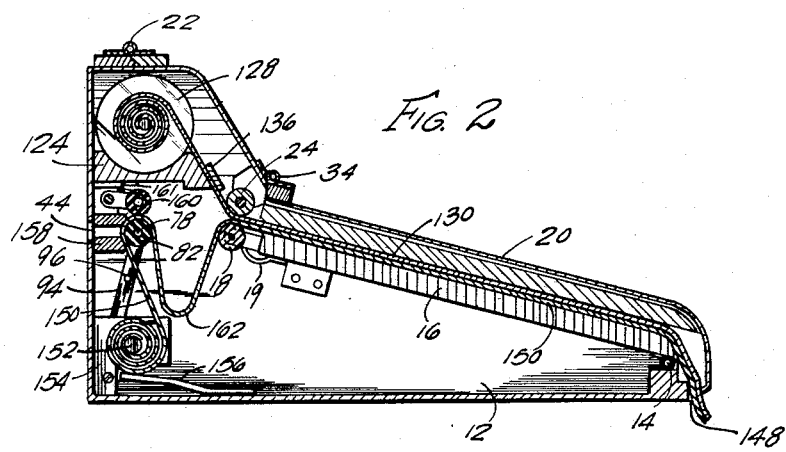
Fig. 2 is a sectional view taken on line 2—2 of Fig. 1.
Figure 3:
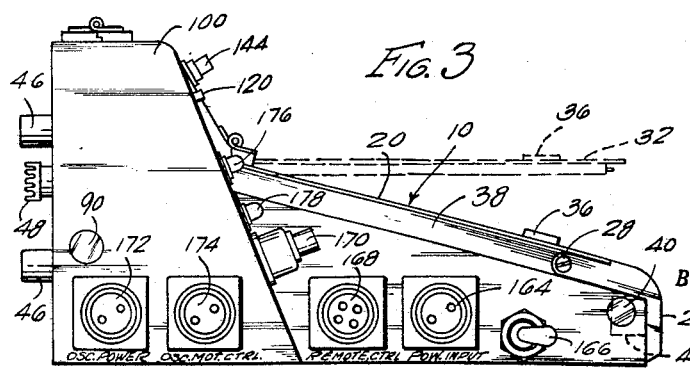
Fig. 3 is a side elevational view taken on line 3—3 of Fig. 1.

Pivoted to one end of the housing 12 as at 14 is a plate 16 having a roller 18 rotatably mounted at its free end. This roller is spring-loaded by spring 19. A cover plate 20 is pivoted at 22 to the opposite end of the housing and is provided with a roller 24 similar to roller 18 and adapted to overlie the roller 18 when the cover is in the closed position as illustrated in Fig. 2. A cutting edge device 26 is pivoted as at 28 to the rear end of the cover plate 20 and an opening 30 is formed in the top of the cover plate itself. A hinged closure plate 32 is pivotally attached to the cover plate as at 34 and is provided with a latch means 36 to hold it locked in closed position. A side flange 38 is formed at each side of the cover plate 20 to overlap the plate 16. At the rear end of the housing a pair of set screws 40 are adapted to enter openings in a pair of bosses 42 depending from the cover plate 20 in order to keep the cover plate locked in closed position.

At the front end of the housing there is provided a slot 44, a pair of attaching pins 46 and a clutch 48, the pins 46 being adapted to connect the attachment 10 to an ordinary oscillograph (not shown) while the slot 44 is adapted to coincide with the window in the oscillograph through which appear the oscillograph traces. The clutch 48 is adapted to connect the worm 50 to the armature shaft of the oscillograph motor. The recess 51 is provided merely for the purpose of receiving projecting parts of the oscillograph with which this invention is not concerned.

The worm 50 meshes with a gear 52 within the gear box 54, this gear 52 being mounted on a shaft 56 upon which is also mounted, outwardly of the gear box 54, a drive gear 58. This gear 58 is adapted to drive both a metering gear 60 and an idler gear 62 which is mounted at the end of a rockable arm 64 suspended from a shaft 66 mounted within the gear housing 68. The arm 64 is biased by a spring 70 in such a manner that the gear 62 is held against the drive gear 58. A stop 72, however, limits the spring-pressed movement of the arm. Mounted on an arm 74 pivoted to the gear housing 68 as at 76 is a shaft 78 at one end of which is fixed the gear 80. Also provided on the shaft 78 is a rubber coated roller 82 positioned within the housing 12 and coaxial with the gear 80. A slot 84 is provided in the side wall of the gear housing to allow the shaft 78 and roller 82 to pivot with the arm 74. A bracket 86 extends from the front wall of the gear housing, this bracket being provided with a hole 88 for accommodating a set screw 90. A hole 92 is also provided in the arm 74 to receive the screw 90 for locking the arm in its uppermost position. A pivoted arm 94 illustrated in Fig. 2 similar to arm 74 is provided within the housing 12 adjacent the opposite side wall of the housing. This arm 94 holds the opposite end of the shaft 78 and is provided with a hole 96 similar to hole 90 for receiving a set screw 98 extending through the wall of the housing. A removable plate 100 is adapted to close the gear housing 68 and this plate is provided with an opening coincident with opening 88 so as to allow the pin 90 to be manipulated to lock and unlock the arm 74 even when the gear housing is closed by the plate 100.

The roller 82 is adapted to drive a film strip, as shall be hereinafter more fully described, and when it is in the position illustrated in Fig. 2, the gear 80, as illustrated in Fig. 4, is driven by the drive gear 58 through the idler gear 62 to rotate the roller 82 in synchronism with the oscillograph motor. At the same time, the gear 58 also drives the metering gear 60. This metering gear acts to shut off the motor and stop the running of the film strip after one revolution of the metering gear which corresponds to a fixed length of the film strip. This is accomplished by means of a cam 102, integral with one face of the gear 60, which actuates a micro-switch 104 connected to the oscillograph motor.

The micro-switch 104 is mouted on one arm 106 of a rocker 108 pivoted on the shaft 66 coaxially with the arm 64. The other arm 110 of the rocker is provided with a pin 112 which is adapted to enter a recess 114 formed in a spring arm 116 attached to the rear wall of the gear housing at 118. The micro-switch is a circuit-breaker which is normally closed and when the micro-switch is actuated it opens the motor circuit. In Fig. 5 the full line position of the micro-switch is in that position wherein the cam does not depress the micro-switch allowing the motor circuit to be closed. When the cam 102 reaches the dotted-line position it pushes the pin 112 into the recess 114 moving the micro-switch into a position wherein it may thereafter be depressed by the cam to open the motor circuit and halt the operation of the device. In order to re-set the micro-switch to its full-line position, it is necessary to manually depress the button 120 to the inner end of which is attached a plate 122. When the button 120 is depressed, the plate 122 pushes against the end of the arm 110 and rocks the rocker 108 back so that the pin 112 is forced out of the recess 114. This closes the motor circuit and thereby places it in a condition wherein it can be actuated by the application of electrical power as will be hereinafter more fully set forth.

With the housing 12, laterally of the gear housing 68, is provided a platform 124, as best shown in Figs. 2 and 7, upon the top surface of which is provided a recess 126. A pair of discs 128, one adjacent each wall of the housing, are mounted within the recess, and between these discs there is adapted to be positioned a roll of photosensitive sheet material of the Polaroid-Land type. This sheet material is illustrated at 130 in Fig. 10 and comprises a laminated sheet wherein one layer carries the developing and printing means in the form of a chemical composition contained within pods, and the other layer carries that part of the material which becomes the finished print. The actual structure of this sheet material is not illustrated in full here since it is merely the standard Polaroid type and forms no part of this invention. Fig. 10 merely illustrates the top layer of the sheet including the perforated portions 132 which eventually form the finished prints and are removable from the remaining portion of the layer, this remaining portion being merely spacing material which becomes waste. Also illustrated are the pairs of perforations 134 for a purpose to be hereinafter explained.

The sheet material 130 extends past a bar 136, illustrated in Figs. 2, 7 and 9 which is connected to the cover plate by screws 137 and is provided with a pair of slots 138 through each of which extends a pin 140. The pins 140 are connected to a bar 142 which is pivoted at its lower edge to the bar 136 and which is connected by means of a slotted flange 141 at its upper edge to a pin 143, this pin being, in turn, connected to a push button 144 on the outer surface of the cover. A spring 146 biases the lower end of the bar 142 in a clockwise direction as viewed in Fig. 7 so that the pins 140 normally extend fully through the slots 138. However, when the button 144 is depressed, the pins 140 are retracted from their normally fully extended position. These pins 140 are adapted to extend through one of the pairs of perforations 134 in the sheet material 130 for the purpose of locking the sheet material in place. When it is desired to pull the sheet material on through the attachment, the button 144 is depressed and the sheet material is thereby released from the pins. This sheet material also extends beneath the roller 24 and onto the plate 16, as best shown in Fig. 2, with the end portion thereof extending through the end slot 148 in the attachment.

The negative film 150 upon which the oscillograph trace images are imposed, is placed into the device in the form of a roll mounted on a spool 152 having end pins each of which fits within a bayonet recess in one of a pair of oppositely disposed yoke members 154. A pair of spring plates 156, only one of which is shown in Fig. 2, bears upon the roll to keep it tight. The film is then threaded past the lips 158 of the aperture 44 and between the rubber coated roller 82 and a rubber coated guide roller 160 pivotally mounted in the housing immediately above the lips 158 and biased by a spring 161. When threading the film over the roller 82, the roller is brought to its loading position as indicated by the dotted outline of arm 74 in Fig. 4, and then locked in its upright position as in Fig. 2. The film is, thereafter, threaded between the rollers 18 and 24, underlying the sheet 130 and extends through the slot 148.

When the machine is in operation while filming the oscillograph traces, the sheet 130 is locked in position, as shown in Fig. 2. The film 150, however, is run off from its spool by the rotation of the roller 82, the film moving past the aperture 44 where it receives the images of the oscillograph traces. As the film moves over the roller 82 it forms a loop of exposed film as illustrated at 162 in Fig. 2. After the power is shut off by the action of the cam 102 mounted on the metering gear 60, and the film stops running, the push button 144 is depressed and the ends of the sheet 130 and film 150 projecting through the slot 148 are manually pulled out between the presser rollers 18 and 24 until the loop 162 is removed.

It should be here pointed out that the length of film which is metered by the action of the motor is always slightly less than the distance between the pairs of metering openings 134. This prevents the overrunning of the metering roller drive motor from affecting the final position of the film. The final position of the film is effected by manually pulling the sheet and film through the slot 148 until the pins 140 fall in place in the openings 134. To allow for this additional movement of the film, gear 80 acts as an escapement mechanism and this action of the gear 80 is permitted by the pivotal mounting of the arm 64 at the end of which the gear 62 is positioned. The exposed film is now in position on top of the plate 16 in juxtaposition with a portion of the sheet 130. Since the pods on the sheet 130 have been broken and the developing material spread by means of the presser rollers 18 and 24, developing and printing takes place during a predetermined time interval, which is about a minute, while the sheet and film are in juxtaposition. This is the standard Polaroid-Land process. After the predetermined time has elapsed, the closure 32 is lifted and the perforated portion 132 of the sheet material is removed. During the next cycle of operation of the machine after the loop 162 has been formed, the sheet 130 and film 150 are pulled through the machine as before and the portions of film and sheet which have been pulled out of the machine through the slot 148 are the remains of the previous printing process and may be torn off at the cutting edge of member 26. These remains are mere waste and may be disposed of as desired.

It is to be noted that the operation of the oscillograph is controlled through the camera attachment which is, itself, adapted to be operated by remote control. The power is put into the device at 164, this being controlled by a manual switch 166. The reset push button 120 is then depressed to place the motor circuit in position for electrical reset, either locally or remotely. The oscillograph may then be operated by remote control momentary contact through inlet 168. The connection for the power input to the oscillograph from the attachment is made at 172 and the remote control connection for the oscillograph is at 174. When the metering cycle reset button 120 is depressed, the electrical connection is such that the light 176 lights up. When the manual button 170 is depressed the light 178 lights up.

The actual electrical circuit is illustrated in Fig. 11 where the power input is shown at 200. With the switch 202, corresponding to the lever 166, closed, and with the switch 204, corresponding to the microswitch 104, closed, power is put into D on remote control panel 206. Momentary switch 208 is a remote reset and completes a circuit through relay 212. After the momentary switch 208 opens, relay 212 remains closed through contact 210. The momentary switch 214 is then actuated supplying power through C to relay 216 and to relay interlock 218. After momentary switch 214 opens, relay interlock 218 keeps relay 216 closed. This supplies power to the oscillograph relay between F and G. This closes the circuit to the oscillograph motor connected between I and H. It should be noted that the circuit to lamp 176 is closed by closing of the switch 204 corresponding to microswitch 104, while the closing of switch 220 corresponding to push button 170 serves the same purpose as switch 208 and closes the circuit to the lamp 178. Terminal B merely provides power to an indicator light at the remote control position.

Obviously many modifications and variations of the present invention are possible in the light of the above teachings. It is, therefore, to be understood that within the scope of the appended claims the invention may be practiced otherwise than as specifically described.

What is claimed as the invention is:

1. In a camera attachment for oscillographs, a housing, means in said housing for moving a film strip lengthwise, means in said housing for exposing said moving film strip to the traces of an oscillograph, means in said housing for stopping both the operation of the oscillograph and the movement of said film strip after a predetermined length of said film has been exposed, means in said housing for forming said film strip into a loop after it has been exposed, means in said housing for holding a strip of self-developing and printing photographic material in a predetermined position, means in said housing for permitting said loop of film to be pulled into a position within said housing wherein the film lies in juxtaposition to said strip of photographic material, means on said housing for permitting the removal of a finished photographic print from said housing, and manually operated means on said housing for permitting the re-activation of said oscillograph and the further lengthwise movement of said film strip.

2. In a camera attachment for oscillographs, a housing, means in said housing for longitudinally moving a film strip within said housing past an aperture formed in a wall of said housing, said means comprising a driven roller mounted on a pair of swingable arms, said arms being constructed and arranged to move said roller from a position adjacent said aperture to a position remote therefrom, means on said housing for locking said arms in that position wherein said roller is adjacent said aperture, means in said housing for driving said roller, means in said housing for forming said film strip into a loop after it passes over said roller, means to stop the longitudinal movement of said film strip after a predetermined interval, means in said housing for holding a strip of self-developing and printing photographic material in a predetermined position, and means for permitting the juxtaposition of said film strip to said strip of self-developing and printing photographic material.

3. The apparatus of claim 2 wherein the means for driving said roller comprises a gear mechanism and clutch means drivingly connected thereto for connecting said gear mechanism to the oscillograph motor.

4. The apparatus of claim 3 wherein said means for stopping the longitudinal movement of said film strip comprises a movable micro-switch for interrupting the circuit between the oscillograph motor and a source of electrical power, and a cam mounted on a gear in said housing, said gear being constructed and arranged to be driven in synchronism with said gear mechanism for driving said roller, said cam being constructed and arranged to by-pass said micro-switch when said micro-switch is in a first position of adjustment and said gear is in a first position of rotational movement, to move said micro-switch to a second position of adjustment when said gear is in a second position of rotational movement, and to actuate said micro-switch when said gear has, thereafter, returned to its first position of rotational movement.

5. An attachment for an oscillograph comprising a housing, a pair of spaced parallel plates within said housing, an aperture in one wall of said housing laterally spaced from the corresponding ends of said plates, a roller affixed to each of the said corresponding ends of said plates, said rollers being positioned intermediate said plates and said aperture and one of said rollers being positioned laterally of the other, with the axis of one roller being parallel to the axis of the other, a second pair of rollers positioned in said housing intermediate said aperture and said first pair of rollers, one of said second pair of rollers being mounted in a relatively fixed position and the other being movable from a position adjacent the first mentioned roller of said second pair of rollers to a position remote therefrom, means to lock said movable roller in a position adjacent the first mentioned roller of said second pair of rollers, means to rotate said movable roller, and means to stop the rotation of said movable roller after a predetermined interval.

6. In a camera attachment for oscillographs, a main housing, an aperture in one wall of said main housing for receiving oscillograph traces, means on said main housing for connecting said main housing to an oscillograph, a gear housing connected to said main housing at one side thereof, a shaft extending through one wall of said gear housing, said shaft having worm teeth formed on that portion thereof which is positioned within said gear housing and having a clutch adapted to connect said shaft to an oscillograph motor armature provided at that end thereof which lies outside said gear housing, a second shaft within said gear housing perpendicular to and overlying said first shaft, a gear on said second shaft meshing with the worm teeth on said first shaft, a drive gear on said second shaft spaced from the first mentioned gear thereon, a rocker arm mounted within said gear housing and having an idler gear at the free end thereof, said idler gear being adapted to mesh with said drive gear, said rocker arm being spring-pressed toward a position wherein said idler gear is in mesh with said drive gear, a second rocker arm in said gear housing, said second arm being pivotally attached at one end to a wall of said gear housing, a slot in said wall effecting an opening between said gear housing and said main housing, a third rocker arm in said main housing and pivoted to one wall thereof, said third arm being pivotally movable in a plane parallel to the plane of pivotal movement of said second arm, a shaft extending between the free ends of said second and third arms and rotatably mounted thereon, a roller fixed to said last mentioned shaft within said main housing for moving a strip of film, a driven gear on said last mentioned shaft within said gear housing, said driven gear being movable on said second arm from a position wherein it meshes with said idler gear to a position remote therefrom, means to lock said second and third arms in a position wherein said driven gear and idler gear are in mesh, a second roller within said housing adjacent said aperture, arranged in a position wherein it is adjacent said first roller when said idler gear is in mesh with said driven gear, means in said main housing for holding a roll of positive self-printing, photographic sheet material, a pair of spaced, adjacent presser rollers within said main housing between which said film and said positive sheet material are adapted to pass in juxtaposed relationship to each other, and a platform within said main housing for supporting said juxtaposed film and positive sheet material during the printing process.

References Cited in the file of this patent

UNITED STATES PATENTS

| | | |
|---|---|---|
| 919,162 | Gunning et al. | Apr. 20, 1909 |
| 1,017,984 | Martin | Feb. 20, 1912 |
| 2,091,826 | Manger | Aug. 31, 1937 |
| 2,298,574 | Lockhart | Oct. 13, 1942 |
| 2,320,350 | Del Riccio | June 1, 1943 |
| 2,373,114 | Goldsmith | Apr. 10, 1945 |
| 2,433,129 | Land | Dec. 23, 1947 |
| 2,483,014 | Land et al. | Sept. 27, 1949 |
| 2,584,175 | Williams | Feb. 5, 1952 |
| 2,605,162 | Gantt | July 29, 1952 |